(12) United States Patent (10) Patent No.: US 7,465,135 B2
Fritsch (45) Date of Patent: Dec. 16, 2008

(54) U-NUT FASTENING ASSEMBLY

(75) Inventor: John Fritsch, Prairie du Sac, WI (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 10/714,191

(22) Filed: Nov. 14, 2003

(65) Prior Publication Data

US 2005/0105985 A1 May 19, 2005

(51) Int. Cl.
*F16B 37/02* (2006.01)
*F16B 39/248* (2006.01)

(52) U.S. Cl. .................. 411/175; 411/112; 411/339; 411/903

(58) Field of Classification Search .......... 411/175, 411/112, 173, 174, 508, 509, 510, 913
See application file for complete search history.

(56) References Cited

U.S. PATENT DOCUMENTS

| 24,572 | A | 6/1859 | Nicolas et al. |
|---|---|---|---|
| 24,678 | A | 7/1859 | Tyng |
| 33,487 | A | 10/1861 | Marsh |
| 33,827 | A | 12/1861 | Davis |
| 45,133 | A | 11/1864 | Bonwill |
| 80,031 | A | 7/1868 | Thompson |
| 142,112 | A | 8/1873 | Corning et al. |
| 154,255 | A | 8/1874 | Ives |
| 185,936 | A | 1/1877 | Landfear |
| 197,467 | A | 11/1877 | Harvey |
| 205,990 | A | 7/1878 | Armstrong |
| 218,425 | A | 8/1879 | Bradley |
| 243,493 | A | 6/1881 | Bloom |
| 272,589 | A | 2/1883 | Searls |
| 292,063 | A | 1/1884 | Shailer |
| 229,287 | A | 5/1884 | Stevens |
| 324,487 | A | 8/1885 | Rice |
| 367,196 | A | 7/1887 | Deblieux |
| 369,362 | A | 9/1887 | Plank |
| 388,000 | A | 8/1888 | Rider |
| 429,851 | A | 6/1890 | Ericson |
| 433,696 | A * | 8/1890 | Raudnitz .................. 24/379.1 |
| 443,799 | A | 12/1890 | Searls |

(Continued)

FOREIGN PATENT DOCUMENTS

AU    B-1 785 270    1/1972

(Continued)

OTHER PUBLICATIONS

Textron Fastening Systems Torx® Drive System, 2001, pp. 1-8, Textron Fastening Systems.

(Continued)

*Primary Examiner*—Jack W. Lavinder
(74) *Attorney, Agent, or Firm*—Dana Andrew Alden (57) ABSTRACT

The present invention relates to a U-nut comprising, a substrate including a flex area wherein the substrate and the flex area include a polymer, a first substrate segment, a second substrate segment, and a flex area, wherein the first substrate segment and the second substrate segment are located adjacent to the flex area; a retainer located on the first substrate segment; and an acceptor located on the second substrate segment.

12 Claims, 8 Drawing Sheets

U.S. PATENT DOCUMENTS

| | | | |
|---|---|---|---|
| 449,887 A | 4/1891 | Harvey |
| 453,563 A | 6/1891 | Nicholson |
| 464,301 A | 12/1891 | Harvey |
| 497,510 A | 5/1893 | Adler |
| 551,043 A | 12/1895 | Otto |
| 553,780 A | 1/1896 | Dickason |
| 586,232 A | 7/1897 | English |
| 594,330 A | 11/1897 | Cox, Jr. |
| 613,776 A | 11/1898 | Plain |
| 638,326 A | 12/1899 | Farr |
| 684,673 A | 10/1901 | Clark |
| 712,905 A | 11/1902 | Cannon |
| 715,891 A | 12/1902 | Somerby |
| 720,580 A | 2/1903 | Greenfield |
| 738,217 A | 9/1903 | Love |
| 752,628 A | 2/1904 | Miner |
| 793,824 A | 7/1905 | Culliney |
| 794,127 A | 7/1905 | Slayton et al. |
| 819,158 A | 5/1906 | Neider |
| 827,562 A | 7/1906 | Pollock et al. |
| 843,720 A | 2/1907 | Waddell et al. |
| 853,005 A | 5/1907 | Dawkins |
| 887,962 A | 5/1908 | Reisner |
| 889,593 A | 6/1908 | Fleischmann |
| 909,033 A | 1/1909 | Smith |
| 910,712 A | 1/1909 | McCoy |
| 920,947 A | 5/1909 | Gilmore |
| 948,326 A | 2/1910 | Hesse |
| 949,741 A | 2/1910 | Loehr |
| 986,510 A | 3/1911 | Scott |
| 1,000,280 A | 8/1911 | Messenger |
| 1,011,398 A | 12/1911 | Andregg |
| 1,015,059 A | 1/1912 | Morgan |
| 1,016,897 A | 2/1912 | Ryan |
| 1,036,825 A | 8/1912 | Garchey |
| 1,040,215 A | 10/1912 | Kriner |
| 1,048,590 A | 12/1912 | Russell |
| 1,049,590 A | 1/1913 | Mosher |
| 1,059,260 A | 4/1913 | Barrett |
| 1,064,792 A | 6/1913 | Vance |
| 1,070,247 A | 8/1913 | Haines |
| 1,075,310 A | 10/1913 | Ulrich |
| 1,081,631 A | 12/1913 | Siever |
| 1,088,892 A | 3/1914 | Foreman |
| 1,112,525 A | 10/1914 | Darling |
| 1,140,974 A | 5/1915 | Formby |
| 1,143,091 A | 6/1915 | Stimpson |
| 1,146,078 A | 7/1915 | Moore |
| 1,150,362 A | 8/1915 | Hascall |
| 1,158,454 A | 11/1915 | De Camp |
| 1,201,944 A | 10/1916 | Dodds |
| 1,210,310 A | 12/1916 | Hickling et al. |
| 1,229,911 A | 6/1917 | Dodds |
| 1,235,626 A | 8/1917 | Woodward |
| 1,238,636 A | 8/1917 | Christofferson |
| 1,250,748 A | 12/1917 | Woodward |
| 1,254,514 A | 1/1918 | Lehmann |
| 1,288,893 A | 12/1918 | Holmes |
| 1,294,268 A | 2/1919 | Holmes |
| 1,297,845 A | 3/1919 | Hawrylasz |
| 1,300,801 A | 4/1919 | Woodward |
| 1,320,259 A | 10/1919 | Martens |
| 1,325,577 A * | 12/1919 | Pilkington | 24/613 |
| 1,363,710 A | 12/1920 | Best |
| 1,374,106 A | 4/1921 | Perlman |
| 1,381,437 A | 6/1921 | Smith |
| 1,406,315 A | 2/1922 | Whittaker |
| 1,411,184 A | 3/1922 | Rosenberg |
| 1,451,484 A | 4/1923 | Woodward |
| 1,465,148 A | 8/1923 | Heyman |
| 1,495,687 A | 5/1924 | Grosclaude |
| 1,543,282 A | 6/1925 | De Loe |
| 1,554,249 A | 9/1925 | Wolf |
| 1,556,599 A | 10/1925 | Harbecke |
| 1,581,559 A | 4/1926 | Williams |
| 1,592,627 A | 7/1926 | Egleston |
| 1,611,408 A | 12/1926 | Bowers |
| 1,622,581 A | 3/1927 | Gunkel |
| 1,626,863 A | 5/1927 | Nacey |
| 1,362,082 A | 7/1927 | Hultgreen et al. |
| 1,660,455 A | 2/1928 | Plumb |
| 1,668,025 A | 5/1928 | Olson |
| 1,676,482 A | 7/1928 | De Lapotterie |
| 1,697,118 A | 1/1929 | Hoke |
| 1,708,793 A | 4/1929 | Jones |
| 1,727,590 A | 9/1929 | Ferry |
| 1,741,279 A | 12/1929 | Bowman |
| 1,749,903 A | 3/1930 | Cannon |
| 1,759,339 A | 5/1930 | Anderson |
| 1,761,581 A | 6/1930 | Northey et al. |
| 1,798,604 A | 3/1931 | Hoke |
| 1,799,941 A | 4/1931 | Wulle |
| 1,802,668 A | 4/1931 | Newton |
| 1,807,494 A | 5/1931 | Proctor |
| 1,821,312 A | 9/1931 | Lillig |
| 1,825,419 A | 9/1931 | Plym |
| 1,828,856 A | 10/1931 | Bridges |
| 1,834,871 A | 12/1931 | Rosenberg |
| 1,862,486 A | 6/1932 | Trotter |
| 1,868,083 A | 7/1932 | Wheelwright |
| 1,871,819 A | 8/1932 | Rossman |
| 1,874,657 A | 8/1932 | Trotter |
| 1,887,616 A | 11/1932 | Berge |
| 1,909,477 A | 5/1933 | Trotter |
| 1,923,647 A | 8/1933 | Verg |
| 1,929,808 A | 10/1933 | Cataline |
| 1,938,399 A | 12/1933 | Olson |
| 1,940,675 A | 12/1933 | Crowther |
| 1,952,115 A | 3/1934 | Borst, Jr. |
| 1,952,305 A | 3/1934 | Beck |
| 1,953,305 A | 4/1934 | MacLean |
| 1,957,095 A | 5/1934 | Cole |
| 1,963,542 A | 6/1934 | Bergstrom |
| 1,969,796 A | 8/1934 | Hoke |
| 1,971,676 A | 8/1934 | Borst, Jr. |
| 1,971,917 A | 8/1934 | Newton |
| 2,012,032 A | 8/1935 | Zinnbauer |
| 2,034,494 A | 3/1936 | Stoll |
| 2,037,066 A | 4/1936 | Cook et al. |
| 2,037,586 A | 4/1936 | Olson |
| 2,041,568 A | 5/1936 | Olson |
| 2,054,187 A | 9/1936 | Almdale |
| 2,060,593 A | 11/1936 | Schaurte et al. |
| 2,062,057 A * | 11/1936 | Hobby | 40/202 |
| 2,076,041 A | 4/1937 | Payne |
| 2,093,026 A | 9/1937 | Bernhard |
| 2,095,397 A | 10/1937 | Overmyer |
| 2,102,494 A | 12/1937 | Connell |
| 2,109,778 A | 3/1938 | Meersteiner |
| 2,112,494 A | 3/1938 | Olson |
| 2,128,757 A | 8/1938 | Olson |
| 2,133,555 A | 10/1938 | Mayfield |
| 2,135,637 A | 11/1938 | Gade |
| 2,147,209 A | 2/1939 | Olson |
| 2,147,211 A | 2/1939 | Olson |
| 2,160,706 A | 5/1939 | Olson |
| 2,165,011 A | 7/1939 | Rosenberg |
| 2,165,149 A | 7/1939 | Olson |
| 2,174,578 A | 10/1939 | Graham |
| 2,177,003 A | 10/1939 | Purtell |
| 2,177,004 A | 10/1939 | Purtell |
| 2,177,005 A | 10/1939 | Purtell |
| 2,191,101 A | 2/1940 | Stellin |
| 2,200,227 A | 5/1940 | Olson |

| | | | | | | |
|---|---|---|---|---|---|---|
| 2,210,455 A | 8/1940 | Hosking | | 2,681,678 A | 6/1954 | Hage |
| 2,217,951 A | 10/1940 | Hosking | | 2,685,812 A | 8/1954 | Dmitroff |
| 2,223,202 A | 11/1940 | Bergan | | 2,708,844 A | 5/1955 | Cincel |
| 2,226,491 A | 12/1940 | Gustafson | | 2,735,470 A | 2/1956 | Poupitch |
| 2,228,217 A | 1/1941 | Olson | | 2,740,650 A | 4/1956 | Hutton |
| 2,229,892 A | 1/1941 | Hosking | | 2,741,289 A | 4/1956 | Grow |
| 2,232,336 A | 2/1941 | Meersteiner | | 2,778,399 A | 1/1957 | Mroz |
| 2,232,337 A | 2/1941 | Meersteiner | | 2,779,376 A | 1/1957 | Poupitch |
| 2,234,677 A | 3/1941 | Larsen | | 2,779,379 A | 1/1957 | Willis |
| 2,247,981 A | 7/1941 | Washer | | 2,783,810 A | 3/1957 | Wrigley |
| 2,251,201 A | 7/1941 | Purtell | | 2,788,046 A | 4/1957 | Rosan |
| 2,253,241 A | 8/1941 | MacDonald | | 2,794,476 A | 6/1957 | Hanneman |
| 2,254,503 A | 9/1941 | Thomas et al. | | 2,819,105 A | 1/1958 | Behnke |
| 2,258,342 A * | 10/1941 | Tinnerman ................ 411/112 | | 2,833,326 A | 5/1958 | Knohl |
| 2,263,137 A | 11/1941 | Oestereicher | | 2,844,409 A | 7/1958 | Eksergian |
| 2,266,555 A | 12/1941 | Jordan et al. | | 2,846,744 A | 8/1958 | Becker |
| 2,266,758 A | 12/1941 | Holtz | | 2,846,617 A | 10/1958 | Widmann |
| 2,269,476 A | 1/1942 | Poupitch | | 2,859,074 A | 11/1958 | Easton |
| 2,271,732 A | 2/1942 | Chappius | | 2,873,641 A | 2/1959 | Evans |
| 2,278,062 A | 3/1942 | De Koharovich | | 2,884,038 A | 4/1959 | Overton |
| 2,278,411 A | 4/1942 | Braendel | | 2,886,088 A | 5/1959 | Brancato |
| 2,284,659 A | 6/1942 | Hosking | | 2,895,199 A * | 7/1959 | Jones ........................ 24/618 |
| 2,289,066 A | 7/1942 | Olson | | 2,901,019 A | 8/1959 | Schweppe |
| 2,293,930 A | 8/1942 | Braendel | | 2,913,031 A | 11/1959 | McKay et al. |
| 2,297,957 A | 10/1942 | Hanneman | | 2,914,149 A | 11/1959 | Walker |
| 2,301,181 A | 11/1942 | Ilsemann | | 2,937,040 A | 5/1960 | Hutton |
| 2,302,675 A | 11/1942 | Cherry | | 2,937,060 A | 5/1960 | Lachance |
| 2,308,967 A | 1/1943 | Kuss | | 2,939,160 A | 6/1960 | Mitchell |
| 2,314,897 A | 3/1943 | Purinton | | 2,954,304 A | 9/1960 | Kroyer |
| 2,314,898 A | 3/1943 | Purinton | | 2,959,086 A | 11/1960 | Gerlach et al. |
| 2,330,869 A | 10/1943 | Cherry | | 2,959,204 A | 11/1960 | Rigot |
| 2,333,388 A | 11/1943 | Poupitch | | 2,995,328 A * | 8/1961 | Whitted ...................... 248/71 |
| 2,342,170 A | 2/1944 | Tinnerman | | 3,010,503 A | 11/1961 | Beuter |
| 2,346,835 A | 4/1944 | Green | | 3,020,570 A | 2/1962 | Wallacle et al. |
| 2,349,592 A | 5/1944 | Hosking | | 3,036,669 A | 5/1962 | Schultze et al. |
| 2,350,756 A | 6/1944 | Heinold | | 3,056,443 A | 10/1962 | Knocke |
| 2,352,265 A | 6/1944 | Kapple et al. | | 3,076,208 A | 2/1963 | Moore |
| 2,352,540 A | 6/1944 | Hanneman | | 3,077,218 A | 2/1963 | Ziegler |
| 2,352,982 A | 7/1944 | Tomalis | | 3,078,899 A | 2/1963 | MacLean, III et al. |
| 2,356,098 A | 8/1944 | Steinle et al. | | 3,078,900 A | 2/1963 | Walker |
| 2,367,213 A | 1/1945 | Harding | | 3,079,830 A | 3/1963 | Faroni et al. |
| 2,371,365 A | 3/1945 | Tomalis et al. | | 3,083,796 A | 4/1963 | Bell, Jr. |
| 2,377,405 A | 6/1945 | Davies | | 3,091,795 A * | 6/1963 | Budwig ........................ 16/2.1 |
| 2,382,019 A | 8/1945 | Miller | | 3,102,746 A | 9/1963 | Kerr |
| 2,393,323 A | 1/1946 | Hungerford et al. | | 3,120,254 A | 2/1964 | Waltermire et al. |
| 2,407,160 A | 9/1946 | Kohn | | 3,122,386 A * | 2/1964 | Pearson ..................... 403/163 |
| 2,409,638 A | 10/1946 | Lyon | | 3,124,188 A | 3/1964 | Muenchinger |
| 2,414,870 A | 1/1947 | Harding | | 3,124,408 A | 3/1964 | Oestereicher |
| RE22,926 E * | 10/1947 | Tinnermann ................ 411/175 | | 3,127,919 A | 4/1964 | Swanstrom |
| 2,428,783 A | 10/1947 | Cole | | 3,133,579 A | 5/1964 | Grimm et al. |
| 2,432,531 A | 12/1947 | Lyon | | 3,134,115 A | 5/1964 | Moore et al. |
| 2,437,638 A | 3/1948 | Evans | | 3,138,407 A | 6/1964 | Duggan |
| 2,444,276 A | 6/1948 | Aldrich | | 3,139,786 A | 7/1964 | Ardell |
| 2,467,548 A | 4/1949 | Bradley | | 3,141,489 A * | 7/1964 | Rapata ....................... 411/182 |
| 2,484,644 A | 10/1949 | Poupitch | | 3,144,695 A * | 8/1964 | Budwig ........................ 248/60 |
| 2,484,645 A | 10/1949 | Baumle | | 3,145,753 A * | 8/1964 | Kreider ...................... 411/112 |
| 2,486,769 A | 11/1949 | Watson, Jr. | | 3,147,824 A * | 9/1964 | Henderson ................. 184/88.1 |
| 2,498,221 A | 2/1950 | Poupitch | | 3,158,390 A | 11/1964 | Woodling |
| 2,510,203 A | 6/1950 | Andreasson | | 3,164,055 A | 1/1965 | Duffy |
| 2,529,420 A * | 11/1950 | Ramquist ................ 242/597.4 | | 3,165,136 A | 1/1965 | Horton |
| 2,557,288 A | 6/1951 | Hosking | | 3,177,755 A | 4/1965 | Kahn |
| 2,562,516 A | 7/1951 | Williams | | 3,180,126 A | 4/1965 | Carlson |
| 2,569,989 A | 10/1951 | Harding et al. | | 3,180,202 A | 4/1965 | Kahn |
| 2,588,372 A | 3/1952 | Erb | | 3,182,703 A | 5/1965 | Smyth |
| 2,592,130 A * | 4/1952 | Erb et al. ................. 174/163 R | | 3,186,464 A | 6/1965 | Baumle |
| 2,597,835 A | 5/1952 | Eksergian | | 3,190,334 A | 6/1965 | Wigam |
| 2,610,879 A * | 9/1952 | Pope .......................... 292/320 | | 3,194,292 A | 7/1965 | Borowsky |
| 2,619,146 A | 11/1952 | Poupitch | | 3,196,918 A | 7/1965 | Hampton |
| 2,637,361 A | 5/1953 | Nagel | | 3,199,186 A | 8/1965 | Simpson |
| 2,661,969 A | 12/1953 | Thiry | | 3,200,691 A | 8/1965 | Neuschotz |
| 2,672,659 A | 3/1954 | Becker | | 3,204,679 A | 9/1965 | Walsh |
| 2,675,844 A | 4/1954 | Knohl | | 3,208,328 A | 9/1965 | Myers |
| 2,679,774 A | 6/1954 | MacDonald | | 3,208,493 A | 9/1965 | Holmes |

| Patent No. | Date | Name | Ref |
|---|---|---|---|
| 3,210,820 A * | 10/1965 | Humiston | 24/704.1 |
| 3,213,742 A | 10/1965 | Kahn | |
| 3,213,914 A | 10/1965 | Baumle et al. | |
| 3,221,792 A | 12/1965 | Poupitch | |
| 3,241,589 A | 3/1966 | Enders | |
| 3,246,556 A | 4/1966 | Phipard, Jr. | |
| 3,247,752 A | 4/1966 | Greenleaf et al. | |
| 3,248,747 A | 5/1966 | Scott | |
| 3,249,142 A | 5/1966 | Phipard, Jr. | |
| 3,253,631 A | 5/1966 | Reusser | |
| 3,253,727 A | 5/1966 | Hart | |
| 3,263,727 A | 8/1966 | Herpolsheimer | |
| 3,275,055 A | 9/1966 | Gutshall | |
| 3,279,519 A | 10/1966 | Neuschotz | |
| 3,286,579 A | 11/1966 | Lovisek | |
| 3,295,580 A | 1/1967 | Waltermire | |
| 3,301,299 A | 1/1967 | Stanwick | |
| 3,305,987 A | 2/1967 | Weaver | |
| 3,307,893 A | 3/1967 | Williams | |
| 3,322,019 A | 5/1967 | Lovisek | |
| 3,329,190 A | 7/1967 | Oldenkott | |
| 3,332,464 A | 7/1967 | Castel | |
| 3,339,389 A | 9/1967 | Moscow | |
| 3,342,234 A | 9/1967 | Evans | |
| 3,343,580 A | 9/1967 | Coldren | |
| 3,346,278 A | 10/1967 | Yocum | |
| 3,352,344 A | 11/1967 | Lanius, Jr. | |
| 3,356,421 A | 12/1967 | Trevarrow, Jr. | |
| 3,366,421 A | 1/1968 | Bradley | |
| 3,370,631 A | 2/1968 | James | |
| 3,381,733 A | 5/1968 | Stanwick | |
| 3,384,394 A | 5/1968 | O'Connor | |
| 3,385,340 A | 5/1968 | Evans | |
| 3,385,341 A | 5/1968 | Garstkiewicz | |
| 3,386,771 A | 6/1968 | Verdier | |
| 3,389,734 A | 6/1968 | Gutshall | |
| 3,389,735 A | 6/1968 | Katz | |
| 3,391,721 A | 7/1968 | Rosan | |
| 3,398,625 A | 8/1968 | Ansingh | |
| 3,398,775 A | 8/1968 | Morin | |
| 3,399,589 A | 9/1968 | Breed | |
| 3,399,705 A | 9/1968 | Breed et al. | |
| 3,416,200 A * | 12/1968 | Daddona, Jr. | 24/662 |
| 3,417,802 A | 12/1968 | Oldenkott | |
| 3,418,012 A | 12/1968 | La Torre | |
| 3,426,820 A | 2/1969 | Phipard, Jr. | |
| 3,428,377 A | 2/1969 | Christian et al. | |
| 3,430,673 A | 3/1969 | Rapta | |
| 3,438,416 A | 4/1969 | Thurston | |
| 3,451,080 A | 6/1969 | McIntyre et al. | |
| 3,454,070 A | 7/1969 | Phipard, Jr. | |
| 3,459,250 A | 8/1969 | Tabor | |
| 3,472,119 A | 10/1969 | Peterson, Jr. | |
| 3,476,010 A | 11/1969 | Markey | |
| 3,481,178 A | 12/1969 | Wilkins | |
| 3,481,380 A | 12/1969 | Breed | |
| 3,485,134 A | 12/1969 | Ott | |
| 3,492,906 A | 2/1970 | Hauser | |
| 3,492,908 A | 2/1970 | Thurston | |
| 3,500,886 A | 3/1970 | Dvorak | |
| 3,504,722 A | 4/1970 | Breed | |
| 3,517,717 A | 6/1970 | Orlomoski | |
| 3,520,342 A | 7/1970 | Scheffer | |
| 3,520,343 A | 7/1970 | Evans | |
| 3,527,136 A | 9/1970 | Wilson | |
| 3,530,760 A | 9/1970 | Lindstand | |
| 3,530,920 A | 9/1970 | Podell | |
| 3,540,509 A | 11/1970 | Gutshall | |
| 3,543,826 A | 12/1970 | Fogaard | |
| 3,549,204 A | 12/1970 | Spisak | |
| 3,561,074 A * | 2/1971 | Long et al. | 24/682.1 |
| 3,561,820 A | 2/1971 | Chaivre | |
| 3,584,667 A | 6/1971 | Reiland | |
| 3,585,900 A | 6/1971 | Chaivre | |
| 3,588,792 A * | 6/1971 | Kindell | 439/801 |
| 3,595,506 A * | 7/1971 | Saunders | 248/71 |
| 3,597,803 A * | 8/1971 | Van Neil | 24/16 PB |
| 3,605,845 A | 9/1971 | Junker | |
| 3,633,455 A | 1/1972 | Larson | |
| 3,640,326 A | 2/1972 | Brown | |
| 3,643,543 A | 2/1972 | Gutshall | |
| 3,649,079 A | 3/1972 | English | |
| 3,653,241 A | 4/1972 | Orlomoski | |
| 3,659,491 A | 5/1972 | Duff et al. | |
| 3,661,046 A | 5/1972 | Waud | |
| 3,662,643 A | 5/1972 | Scheffer | |
| 3,687,184 A | 8/1972 | Wagner | |
| 3,693,685 A | 9/1972 | Onufer | |
| 3,704,739 A * | 12/1972 | Holton | 411/103 |
| 3,708,835 A * | 1/1973 | Bienz | 24/16 PB |
| 3,712,655 A * | 1/1973 | Fuehrer | 292/321 |
| 3,718,355 A * | 2/1973 | Canter | 292/321 |
| 3,721,283 A | 3/1973 | Evans | |
| 3,729,780 A * | 5/1973 | White | 24/704.2 |
| 3,731,725 A | 5/1973 | Brophy | |
| 3,734,483 A | 5/1973 | Adams | |
| 3,742,808 A | 7/1973 | Trembley | |
| 3,750,525 A | 8/1973 | Waters et al. | |
| 3,752,203 A | 8/1973 | Hill, Jr. | |
| 3,762,455 A | 10/1973 | Anderson, Jr. | |
| 3,782,436 A | 1/1974 | Steiner | |
| 3,789,644 A | 2/1974 | Orlomoski | |
| 3,794,092 A | 2/1974 | Carson et al. | |
| 3,800,396 A | 4/1974 | Puchner | |
| 3,812,639 A | 5/1974 | Sygnator | |
| 3,813,179 A | 5/1974 | Priest | |
| 3,816,701 A | 6/1974 | Stromer | |
| 3,822,902 A | 7/1974 | Maurer et al. | |
| 3,823,526 A | 7/1974 | Rose | |
| 3,825,051 A | 7/1974 | Sigmund | |
| 3,828,515 A | 8/1974 | Galgoczy et al. | |
| 3,830,271 A | 8/1974 | Soubitez | |
| 3,850,215 A | 11/1974 | Orlomoski | |
| 3,851,690 A | 12/1974 | Wing et al. | |
| 3,856,065 A | 12/1974 | Gehring | |
| 3,857,611 A | 12/1974 | Pansky | |
| 3,867,871 A | 2/1975 | Shore | |
| 3,875,780 A | 4/1975 | Cochrum et al. | |
| 3,877,339 A | 4/1975 | Muenchinger | |
| 3,877,502 A | 4/1975 | Hunckler | |
| 3,878,759 A | 4/1975 | Carlson | |
| 3,881,391 A | 5/1975 | Dereszynski | |
| 3,890,680 A * | 6/1975 | Furuya | 24/614 |
| 3,895,663 A | 7/1975 | Bachline et al. | |
| 3,901,066 A | 8/1975 | Orlomoski | |
| 3,907,017 A | 9/1975 | Stanwick | |
| 3,910,331 A | 10/1975 | Randall | |
| 3,926,237 A | 12/1975 | Enders | |
| 3,929,265 A * | 12/1975 | Pyne et al. | 224/178 |
| 3,935,785 A | 2/1976 | Lathom | |
| 3,942,406 A | 3/1976 | Egner | |
| 3,942,570 A | 3/1976 | Bochman, Jr. et al. | |
| 3,960,047 A | 6/1976 | Liffick | |
| 3,967,083 A | 6/1976 | Bould et al. | |
| 3,967,669 A | 7/1976 | Egner | |
| 3,971,289 A | 7/1976 | Chaivre | |
| 3,972,360 A | 8/1976 | Cadwallader | |
| 3,975,992 A | 8/1976 | Cagle | |
| 3,978,760 A | 9/1976 | Muenchinger | |
| 3,982,575 A | 9/1976 | Ollis, Jr. et al. | |
| 3,999,583 A * | 12/1976 | Nelson | 411/182 |
| 4,015,503 A | 4/1977 | Romano | |
| 4,018,133 A | 4/1977 | Chaivre et al. | |
| 4,019,550 A | 4/1977 | DeHaitre | |
| 4,034,788 A | 7/1977 | Melone | |
| 4,035,874 A * | 7/1977 | Liljendahl | 24/114.4 |

| | | | | | |
|---|---|---|---|---|---|
| 4,040,327 A | 8/1977 | Otaki | 4,611,379 A | 9/1986 | Heitzman |
| 4,066,278 A | 1/1978 | Takagi | 4,621,230 A | 11/1986 | Crouch |
| 4,071,067 A | 1/1978 | Goldby | 4,621,831 A | 11/1986 | Takadera et al. |
| 4,074,491 A * | 2/1978 | Bell et al. ............... 52/394 | 4,627,776 A | 12/1986 | Pamer et al. |
| 4,076,064 A | 2/1978 | Holmes | 4,637,766 A | 1/1987 | Milliser |
| 4,094,352 A | 6/1978 | Hlinsky | 4,652,194 A | 3/1987 | Tajima et al. |
| 4,100,368 A * | 7/1978 | Thomsen ............... 174/138 D | 4,656,689 A * | 4/1987 | Dennis .................. 16/2.2 |
| 4,103,725 A | 8/1978 | Abe | 4,657,459 A | 4/1987 | Landt |
| 4,113,278 A | 9/1978 | Rissberger | 4,659,273 A | 4/1987 | Dudley |
| 4,123,961 A | 11/1978 | Chaivre et al. | 4,665,803 A | 5/1987 | Mathauser |
| 4,134,438 A | 1/1979 | Frieberg et al. | 4,669,937 A | 6/1987 | Feldman |
| 4,136,598 A * | 1/1979 | Hughes .................. 411/372 | 4,673,323 A | 6/1987 | Russo |
| 4,150,702 A | 4/1979 | Holmes | 4,674,931 A | 6/1987 | Schwind |
| 4,169,630 A | 10/1979 | Wagner | 4,697,969 A | 10/1987 | Sparkes |
| 4,171,012 A | 10/1979 | Holmes | 4,704,058 A | 11/1987 | Crunwell |
| 4,201,110 A | 5/1980 | Hanai et al. | 4,708,555 A | 11/1987 | Terry |
| 4,210,372 A | 7/1980 | McGee et al. | 4,712,957 A | 12/1987 | Edwards et al. |
| 4,218,954 A * | 8/1980 | Morel .................... 411/15 | 4,717,299 A | 1/1988 | Underwood |
| 4,220,188 A | 9/1980 | McMurray | 4,718,802 A | 1/1988 | Rockenfeller et al. |
| 4,223,711 A | 9/1980 | Tabor | 4,730,966 A | 3/1988 | Schiefer |
| 4,231,281 A | 11/1980 | Reinwall, Jr. | 4,744,119 A | 5/1988 | Omori |
| 4,252,168 A | 2/1981 | Capuano | 4,749,321 A | 6/1988 | Knohl et al. |
| 4,258,607 A | 3/1981 | Makewam | 4,757,662 A * | 7/1988 | Gasser .................. 52/410 |
| 4,260,005 A | 4/1981 | Stencel | 4,761,860 A * | 8/1988 | Krauss .................. 24/713.6 |
| 4,269,248 A | 5/1981 | MacLean et al. | 4,764,070 A | 8/1988 | Baltzell |
| 4,275,285 A | 6/1981 | Jadach | 4,770,560 A | 9/1988 | Ott |
| 4,281,699 A | 8/1981 | Grube | 4,775,272 A | 10/1988 | Toth |
| 4,283,091 A | 8/1981 | Enders | 4,784,555 A | 11/1988 | Cantrall |
| 4,286,642 A * | 9/1981 | Keatley ................. 411/112 | 4,790,703 A | 12/1988 | Wing |
| 4,289,181 A | 9/1981 | Capuano | 4,793,641 A * | 12/1988 | Sokol .................... 292/322 |
| 4,293,256 A | 10/1981 | Pamer | 4,793,752 A | 12/1988 | Frieberg |
| 4,294,300 A | 10/1981 | Bouwman | 4,798,507 A | 1/1989 | Olak |
| 4,304,148 A * | 12/1981 | Hamman ................ 74/502.4 | 4,808,050 A | 2/1989 | Landt |
| 4,310,272 A | 1/1982 | Rich et al. | 4,810,106 A | 3/1989 | Ohike |
| 4,331,414 A | 5/1982 | Wheatley, Jr. | 4,812,094 A | 3/1989 | Grube |
| 4,339,179 A | 7/1982 | Dany | 4,812,095 A | 3/1989 | Piacenti et al. |
| 4,341,497 A | 7/1982 | Downey et al. | 4,813,835 A | 3/1989 | Toth |
| 4,350,465 A | 9/1982 | Lovisek | 4,815,920 A | 3/1989 | Morooka |
| 4,351,626 A | 9/1982 | Holmes | 4,824,305 A | 4/1989 | McCauley |
| 4,362,449 A | 12/1982 | Hinsky | 4,842,339 A | 6/1989 | Roulinson |
| 4,373,842 A | 2/1983 | Bettini et al. | 4,850,776 A | 7/1989 | Toth |
| 4,376,605 A * | 3/1983 | Thomsen ................ 411/112 | 4,859,977 A * | 8/1989 | Mochizuki et al. ......... 336/65 |
| 4,377,361 A | 3/1983 | Frieberg | 4,867,625 A | 9/1989 | Dixon |
| 4,380,414 A | 4/1983 | Capuano | 4,869,454 A * | 9/1989 | Byrne et al. ............. 248/610 |
| 4,382,635 A | 5/1983 | Brown et al. | 4,869,633 A | 9/1989 | Hayashi |
| 4,407,413 A * | 10/1983 | Jansson ................. 206/493 | 4,878,792 A * | 11/1989 | Frano .................... 411/339 |
| 4,420,848 A | 12/1983 | Becker | 4,883,399 A | 11/1989 | MacLean |
| 4,427,326 A | 1/1984 | Hobson et al. | 4,887,950 A | 12/1989 | Sakayori et al. |
| 4,431,353 A | 2/1984 | Capuano | 4,897,005 A | 1/1990 | Peterson |
| 4,457,560 A | 7/1984 | Rowe et al. | 4,898,429 A | 2/1990 | Pumer |
| 4,460,300 A | 7/1984 | Bettini et al. | 4,900,206 A | 2/1990 | Kazino et al. |
| 4,478,387 A | 10/1984 | Postema | 4,907,924 A | 3/1990 | Hellon |
| 4,482,278 A | 11/1984 | Dorn | 4,934,491 A | 6/1990 | Yamoako |
| 4,484,833 A | 11/1984 | Gallagher, Jr. | 4,941,787 A | 7/1990 | Shaffer |
| 4,488,843 A | 12/1984 | Achille | 4,944,523 A | 7/1990 | Hardey et al. |
| 4,490,082 A | 12/1984 | Barth | 4,944,644 A | 7/1990 | Bell |
| 4,490,920 A | 1/1985 | Griset | 4,948,319 A | 8/1990 | Day et al. |
| 4,498,825 A | 2/1985 | Pamer et al. | 4,955,772 A * | 9/1990 | Reck ..................... 411/175 |
| 4,512,093 A * | 4/1985 | Kolton et al. ............. 40/669 | 4,955,773 A | 9/1990 | Toth |
| 4,516,893 A | 5/1985 | Barth | 4,962,573 A * | 10/1990 | Breveglieri .............. 24/581.1 |
| 4,518,294 A | 5/1985 | Barth | 4,968,202 A | 11/1990 | Lanham |
| 4,521,146 A | 6/1985 | Wharton | 4,969,788 A | 11/1990 | Goiny |
| 4,538,313 A | 9/1985 | Frieberg | 4,971,498 A | 11/1990 | Goforthe |
| 4,543,023 A | 9/1985 | Capuano | 4,973,209 A | 11/1990 | Essom et al. |
| 4,544,312 A | 10/1985 | Stencel | 4,976,576 A | 12/1990 | Mahaney, Jr. et al. |
| 4,544,313 A | 10/1985 | Grossberndt | 4,978,350 A | 12/1990 | Wagenknecht |
| 4,552,379 A | 11/1985 | Foster | 4,984,938 A | 1/1991 | Scott, Jr. et al. |
| 4,557,654 A | 12/1985 | Masuda et al. | 4,986,712 A | 1/1991 | Fultz |
| 4,576,533 A | 3/1986 | Chartier | 4,993,902 A | 2/1991 | Hellon |
| 4,582,462 A | 4/1986 | Thiel | 4,998,780 A | 3/1991 | Eshler et al. |
| 4,583,897 A | 4/1986 | Briles | 4,999,899 A | 3/1991 | Sawyer |
| 4,595,315 A | 6/1986 | Gallagher, Jr. | 5,000,638 A | 3/1991 | Essom et al. |
| 4,599,172 A | 7/1986 | Gardes | 5,003,341 A | 3/1991 | Ohtorii |

| Patent | Type | Date | Name | Ref |
|---|---|---|---|---|
| 5,011,192 | A | 4/1991 | Campo | |
| 5,026,961 | A | 6/1991 | Watanabe et al. | |
| 5,028,093 | A | 7/1991 | Nason | |
| 5,031,268 | A * | 7/1991 | McCabe | 16/2.1 |
| 5,042,113 | A * | 8/1991 | Severson et al. | 24/16 PB |
| 5,048,898 | A | 9/1991 | Russell | |
| 5,054,988 | A | 10/1991 | Shiraiwa | |
| 5,056,801 | A * | 10/1991 | Beadle | 277/577 |
| 5,061,132 | A | 10/1991 | Cosenza | |
| 5,071,301 | A | 12/1991 | Engelhardt et al. | |
| 5,074,728 | A | 12/1991 | Hsu | |
| 5,080,545 | A | 1/1992 | McKinlay | |
| 5,082,409 | A | 1/1992 | Bias | |
| 5,088,869 | A | 2/1992 | Greenslade | |
| 5,090,855 | A | 2/1992 | Terry | |
| 5,094,143 | A | 3/1992 | Anderson, Jr. | |
| 5,094,698 | A | 3/1992 | Gallagher, Jr. | |
| 5,103,538 | A * | 4/1992 | Ryder | 24/662 |
| 5,110,245 | A | 5/1992 | Hiroyuki | |
| 5,112,176 | A | 5/1992 | McCauley | |
| 5,141,374 | A | 8/1992 | Olofsson | |
| 5,145,273 | A * | 9/1992 | Hellon et al. | 403/24 |
| 5,163,739 | A | 11/1992 | Stanlake | |
| 5,163,797 | A | 11/1992 | Patti | |
| 5,180,266 | A | 1/1993 | Nolan et al. | |
| 5,181,767 | A | 1/1993 | Hudgins et al. | |
| 5,183,359 | A | 2/1993 | Barth | |
| 5,190,423 | A | 3/1993 | Ewing | |
| 5,193,884 | A | 3/1993 | Sheu et al. | |
| 5,203,656 | A | 4/1993 | McKinlay | |
| 5,211,551 | A | 5/1993 | Uppal et al. | |
| 5,219,255 | A | 6/1993 | Hussain | |
| 5,226,809 | A * | 7/1993 | Franco | 24/704.1 |
| 5,228,725 | A | 7/1993 | Aoyagi et al. | |
| 5,234,291 | A | 8/1993 | Swemmer | |
| 5,236,520 | A | 8/1993 | Gallagher, Jr. | |
| 5,241,846 | A * | 9/1993 | Hoke | 70/455 |
| 5,242,253 | A | 9/1993 | Fulmer | |
| H1258 | H | 12/1993 | Hindle, Jr. | |
| 5,273,384 | A | 12/1993 | Dunbar | |
| 5,295,652 | A * | 3/1994 | Byrne | 248/635 |
| 5,297,854 | A | 3/1994 | Nielson et al. | |
| 5,302,069 | A | 4/1994 | Toth et al. | |
| 5,306,091 | A | 4/1994 | Zaydel et al. | |
| 5,320,461 | A * | 6/1994 | Stanesic | 411/258 |
| 5,324,148 | A | 6/1994 | Notaro | |
| 5,330,594 | A | 7/1994 | Gallagher, Jr. | |
| 5,333,976 | A | 8/1994 | Dobbrunz | |
| 5,340,254 | A | 8/1994 | Hertel et al. | |
| 5,350,266 | A | 9/1994 | Espey et al. | |
| 5,353,211 | A | 10/1994 | Merko | |
| 5,360,304 | A | 11/1994 | Notaro et al. | |
| 5,370,486 | A | 12/1994 | Plummer | |
| 5,380,070 | A | 1/1995 | FitzGerald | |
| 5,395,195 | A | 3/1995 | Fulmer | |
| 5,407,310 | A * | 4/1995 | Kassouni | 411/107 |
| 5,407,312 | A | 4/1995 | Terrizzi | |
| 5,409,338 | A | 4/1995 | McKinlay | |
| 5,412,874 | A | 5/1995 | Madden | |
| 5,423,646 | A | 6/1995 | Gagnon | |
| 5,449,193 | A | 9/1995 | Rivard et al. | |
| 5,449,216 | A | 9/1995 | Gierman et al. | |
| 5,452,977 | A | 9/1995 | Terrizzi | |
| 5,453,139 | A | 9/1995 | Gallagher, Jr. | |
| 5,454,888 | A | 10/1995 | Gallagher, Jr. | |
| 5,492,019 | A | 2/1996 | Madden | |
| 5,496,425 | A | 3/1996 | Gallagher, Jr. | |
| 5,507,517 | A | 4/1996 | Krawczak | |
| 5,520,445 | A | 5/1996 | Toth | |
| 5,533,849 | A | 7/1996 | Burdick | |
| 5,538,566 | A | 7/1996 | Gallagher, Jr. | |
| 5,551,722 | A | 9/1996 | Schwartz et al. | |
| 5,555,628 | A | 9/1996 | Madden | |
| 5,584,628 | A | 12/1996 | Bernoni | |
| 5,590,992 | A | 1/1997 | Russell | |
| 5,596,177 | A * | 1/1997 | Stark et al. | 174/153 R |
| 5,597,278 | A | 1/1997 | Peterkort | |
| 5,597,279 | A | 1/1997 | Thomas | |
| 5,599,148 | A * | 2/1997 | Hirose | 411/175 |
| 5,622,074 | A | 4/1997 | Cushman | |
| 5,626,449 | A | 5/1997 | Mckinlay | |
| 5,632,584 | A | 5/1997 | Acevedo | |
| 5,634,377 | A | 6/1997 | Kimura et al. | |
| 5,649,587 | A | 7/1997 | Plant | |
| 5,651,651 | A * | 7/1997 | Spencer | 411/372.6 |
| 5,653,564 | A * | 8/1997 | Nakamura | 411/373 |
| 5,667,347 | A | 9/1997 | Matthews | |
| 5,667,348 | A | 9/1997 | Chen et al. | |
| 5,672,037 | A | 9/1997 | Iwata | |
| 5,674,035 | A | 10/1997 | Hettick et al. | |
| D386,068 | S * | 11/1997 | Nakamura | D8/387 |
| 5,688,091 | A | 11/1997 | McKinlay | |
| 5,702,443 | A | 12/1997 | Branemark | |
| 5,702,445 | A | 12/1997 | Branemark | |
| 5,704,631 | A | 1/1998 | Sparks et al. | |
| 5,704,998 | A | 1/1998 | Gallagher, Jr. | |
| 5,711,581 | A | 1/1998 | Plumer | |
| 5,713,707 | A * | 2/1998 | Gagnon | 411/175 |
| 5,730,568 | A | 3/1998 | Lanham et al. | |
| 5,746,560 | A | 5/1998 | Barth et al. | |
| 5,752,794 | A | 5/1998 | Krawczak | |
| 5,772,377 | A | 6/1998 | Bydalek | |
| 5,779,411 | A * | 7/1998 | Vasseur et al. | 411/55 |
| 5,779,709 | A | 7/1998 | Harris, Jr. et al. | |
| 5,807,010 | A | 9/1998 | Parker et al. | |
| 5,810,532 | A | 9/1998 | Huang | |
| 5,810,670 | A | 9/1998 | Yamamuro et al. | |
| 5,820,322 | A * | 10/1998 | Hermann et al. | 411/85 |
| 5,842,749 | A | 12/1998 | DiMarco | |
| 5,857,818 | A | 1/1999 | Bias, Sr. | |
| 5,879,117 | A * | 3/1999 | Chen et al. | 411/373 |
| 5,890,859 | A | 4/1999 | Hasnik | |
| 5,893,694 | A * | 4/1999 | Wilusz et al. | 411/112 |
| 5,918,946 | A | 7/1999 | DiMarco | |
| 5,921,520 | A | 7/1999 | Wisniewski | |
| 5,947,668 | A | 9/1999 | Thommes | |
| 5,961,264 | A * | 10/1999 | Postadan | 411/174 |
| 5,967,721 | A | 10/1999 | Giachinta et al. | |
| 5,980,177 | A | 11/1999 | Schiess et al. | |
| 5,984,602 | A | 11/1999 | Park | |
| 6,006,414 | A | 12/1999 | Corporon et al. | |
| 6,007,079 | A | 12/1999 | Kincaid et al. | |
| 6,007,109 | A | 12/1999 | Schoetz | |
| 6,010,169 | A | 1/2000 | Cox et al. | |
| 6,012,889 | A * | 1/2000 | Robbins et al. | 411/372.6 |
| 6,023,833 | A | 2/2000 | Jacobsmeier | |
| 6,036,420 | A | 3/2000 | Somers et al. | |
| 6,039,408 | A | 3/2000 | Alvarez | |
| 6,039,524 | A | 3/2000 | McKinlay | |
| 6,044,528 | A * | 4/2000 | Schottin | 24/265 AL |
| 6,053,682 | A | 4/2000 | Krauter | |
| 6,062,786 | A | 5/2000 | Garver et al. | |
| 6,074,148 | A | 6/2000 | Wilson | |
| 6,102,488 | A | 8/2000 | Wilson | |
| 6,106,077 | A | 8/2000 | Kluge | |
| 6,106,208 | A | 8/2000 | Lin | |
| 6,123,492 | A * | 9/2000 | Pickard | 411/508 |
| 6,135,689 | A | 10/2000 | Matsunami | |
| 6,135,691 | A | 10/2000 | Nadarajah | |
| 6,137,080 | A | 10/2000 | Borchardt et al. | |
| 6,142,579 | A | 11/2000 | Thiel | |
| 6,149,363 | A | 11/2000 | March | |
| 6,152,412 | A * | 11/2000 | Basickes et al. | 248/317 |
| 6,155,167 | A | 12/2000 | Meyer | |
| 6,155,761 | A | 12/2000 | Donovan | |
| 6,183,180 | B1 | 2/2001 | Copple et al. | |

| | | | |
|---|---|---|---|
| 6,193,283 B1 | 2/2001 | Picker, Jr. et al. | |
| 6,206,606 B1 * | 3/2001 | Mita et al. | 403/320 |
| 6,220,806 B1 * | 4/2001 | Chapman et al. | 411/526 |
| 6,225,566 B1 | 5/2001 | Dienst | |
| 6,227,782 B1 | 5/2001 | Bowling et al. | |
| D443,488 S * | 6/2001 | Palladino | D8/14.1 |
| 6,263,562 B1 | 7/2001 | Gosis et al. | |
| 6,264,413 B1 * | 7/2001 | Bisping et al. | 411/372.6 |
| 6,273,658 B1 | 8/2001 | Patterson et al. | |
| 6,287,064 B1 * | 9/2001 | Jhumra et al. | 411/175 |
| 6,290,445 B1 | 9/2001 | Duran et al. | |
| 6,299,039 B1 * | 10/2001 | Hsu | 223/87 |
| 6,305,627 B1 | 10/2001 | Stiner et al. | |
| 6,305,890 B1 | 10/2001 | Okamura | |
| 6,308,997 B1 | 10/2001 | Haseley et al. | |
| 6,318,942 B1 | 11/2001 | Wiecozorek | |
| 6,325,874 B1 | 12/2001 | Wheeler, Jr. | |
| 6,336,779 B1 * | 1/2002 | Jakob et al. | 411/175 |
| 6,337,456 B1 | 1/2002 | Taniguchi et al. | |
| 6,357,953 B1 | 3/2002 | Ballantyne | |
| 6,381,806 B1 * | 5/2002 | Stanesic et al. | 16/4 |
| 6,402,171 B1 | 6/2002 | Nickerson et al. | |
| 6,412,153 B1 * | 7/2002 | Khachadourian et al. | 24/614 |
| 6,418,772 B1 | 7/2002 | Talbott et al. | |
| 6,435,791 B1 | 8/2002 | Bydalek | |
| 6,450,747 B1 * | 9/2002 | Fischer | 411/174 |
| 6,499,925 B2 | 12/2002 | Duran et al. | |
| 6,503,038 B2 | 1/2003 | McGough | |
| 6,511,132 B1 | 1/2003 | Wright | |
| 6,517,222 B1 | 2/2003 | Orlov | |
| 6,542,372 B1 * | 4/2003 | Paquin et al. | 361/758 |
| 6,554,552 B2 | 4/2003 | McKinlay | |
| 6,572,127 B2 | 6/2003 | Pazdirek | |
| 6,588,999 B2 | 7/2003 | Kubler et al. | |
| 6,592,314 B1 | 7/2003 | Wilson | |
| 6,655,745 B2 | 12/2003 | Fohrenkamm et al. | |
| 6,711,809 B1 | 3/2004 | Fischer et al. | |
| 6,749,386 B2 | 6/2004 | Harris | |
| 6,776,565 B2 | 8/2004 | Chang | |
| 6,808,350 B1 | 10/2004 | Tooman et al. | |
| 6,810,309 B2 | 10/2004 | Sadler et al. | |
| 6,814,400 B2 | 11/2004 | Henderson et al. | |
| 6,824,203 B2 * | 11/2004 | Kanie | 296/204 |
| 6,827,539 B2 | 12/2004 | Somers | |
| 6,843,631 B2 | 1/2005 | Winker | |
| 6,852,181 B2 | 2/2005 | Wheeler, Jr. | |
| 6,860,689 B1 | 3/2005 | Attanasio | |
| 6,860,692 B2 | 3/2005 | Van Ingen et al. | |
| 6,866,457 B2 | 3/2005 | Wilson | |
| 6,878,069 B2 | 4/2005 | Swim, Jr. | |
| 6,896,465 B2 | 5/2005 | Andersson | |
| 6,899,503 B2 | 5/2005 | Anderson et al. | |
| 6,916,144 B2 | 7/2005 | Lees | |
| 6,935,825 B2 | 8/2005 | Winker | |
| 6,957,939 B2 | 10/2005 | Wilson | |
| 6,971,830 B2 * | 12/2005 | Hulin et al. | 411/175 |
| 6,978,522 B2 * | 12/2005 | Liao | 24/459 |
| 7,004,700 B2 | 2/2006 | Wilson | |
| 6,891,829 B1 | 3/2006 | Brewwer et al. | |
| 7,036,875 B2 * | 5/2006 | Kanie | 296/204 |
| 2002/0039522 A1 | 4/2002 | Hartman et al. | |
| 2002/0098033 A1 | 7/2002 | Cardoso | |
| 2003/0005786 A1 | 1/2003 | Stuart | |
| 2003/0040795 A1 | 2/2003 | Elson et al. | |
| 2003/0108403 A1 | 6/2003 | Scoyoc | |
| 2003/0194294 A1 | 10/2003 | Wilson | |
| 2004/0167001 A1 | 8/2004 | Hagihara et al. | |
| 2004/0174015 A1 | 9/2004 | Deremiah | |
| 2005/0008457 A1 | 1/2005 | Winker | |
| 2005/0095085 A1 | 5/2005 | Winker | |

FOREIGN PATENT DOCUMENTS

| | | |
|---|---|---|
| CH | 374 858 A | 1/1964 |
| DE | 593 758 | 3/1934 |
| DE | 79 16 057 U | 9/1979 |
| DE | 33 35 723 A | 4/1985 |
| DE | 87 15 472 U | 2/1988 |
| DE | 41 05 741 A | 9/1992 |
| DE | 41 05 741 A1 | 9/1992 |
| DE | 44 39 567 A | 6/1995 |
| DE | 298 15 492 U1 | 10/1998 |
| DE | 199 56 287 A1 | 5/2001 |
| EP | 0 153 487 A1 | 4/1985 |
| EP | 0 265 132 A | 4/1988 |
| EP | 291412 A1 | 11/1988 |
| EP | 0 939 236 A1 | 1/1999 |
| EP | 0930 175 A | 7/1999 |
| EP | 1 248 004 A2 | 10/2002 |
| FR | 575 341 | 7/1924 |
| FR | 633 186 | 1/1928 |
| FR | 646 842 | 11/1928 |
| FR | 1 261 528 A | 5/1961 |
| FR | 2 121 270 | 8/1972 |
| FR | 2 457 406 A | 12/1980 |
| GB | A-7 781 | 3/1912 |
| GB | A-213 188 | 3/1924 |
| GB | 507 104 | 7/1939 |
| GB | 547 634 | 9/1942 |
| GB | 567 862 | 3/1945 |
| GB | 618388 | 4/1949 |
| GB | 662 298 | 12/1951 |
| GB | 739495 | 10/1955 |
| GB | 830 722 | 3/1960 |
| GB | 2051285 | 1/1981 |
| GB | 2 167 516 | 5/1986 |
| GB | 2 176 859 A | 1/1987 |
| GB | 2 179 416 A | 3/1987 |
| GB | 2201216 | 8/1988 |
| GB | 26739 | 12/2004 |
| JP | 61-286606 | 12/1961 |
| JP | 46-012-091 | 4/1971 |
| JP | 51-026263 | 2/1976 |
| JP | 54-14351 | 2/1979 |
| JP | A-54-147349 | 11/1979 |
| JP | 61-149606 | 7/1986 |
| JP | A-61-192915 | 8/1986 |
| JP | 62-010101 | 1/1987 |
| JP | 62-171510 | 7/1987 |
| JP | A-62-176828 | 8/1987 |
| JP | 06-341420 | 12/1994 |
| JP | 2003-247519 | 5/2003 |
| WO | WO 9407041 | 3/1994 |

OTHER PUBLICATIONS

N. Fugimoto, Notification of Reasons for Rejection, Jul. 28, 2005, pp. 1-5, Japanese Patent Office.

C.J. Huusom, Communication pursuant to Article 96(2) EPC, Feb. 12, 2004, pp. 1-3, European Patent Office.

H. Granger, Supplementary European Search Report, Feb. 23, 2006, pp. 1-2.

C. Martin, Supplementary European Search Report, Jun. 31, 2006, p. 1-3, European Patent Office.

C. Martin, European Search Report, May 20, 2003, pp. 1-4, European Patent Office.

Jeffrey Andrew Sharp, Notice of References Cited, Feb. 14, 2006, p. 1, United States Patent and Trademark Office.

NorthWest Short Line—Bits of Knowledge for Sharing, p. 1.

C. Martin, Supplementary European Search Report, Feb. 18, 2005, pp. 1-3, European Patent Office.

N. Fujimoto, Translation of Official Action, Jan. 4, 2006, pp. 1-5 Japanese Patent Office.

Martin, C., European Search Report for Application No. EP 99102819, Jun. 1, 1999, pp. 1-2, European Patent Office.

Schaeffler, C., Search Report, Sep. 2, 1999, pp. 1-2, The National Institute of Industrial Property, Republic of France.

Examiner, Translation of Notification of Reasons of Rejection, Jun. 28, 1996, pp. 1-2, Japanese Patent Office.

Examiner, Translation of Notification of Reasons of Rejection, Feb. 5, 1997, pp. 1-2, Japanese Patent Office.

Examiner, Translation of Notification of Reasons of Rejection, Mar. 13, 1998, pp. 1-2, Japanese Patent Office.

Translation of Office Action, Circa Nov. 1997, p. 1, Japanese Patent Office.

Translation of the Relevant Portions of JP-U-A-56-148116, which was cited as Reference 1 in the above-referenced Japanese Office Action, Circa Nov. 1997, p. 1.

Translation of the Relevant Portions of JP-U-A-63-152822, which was cited as Reference 2 in the above-referenced Japanese Office Action, Circa Nov. 1997, p. 1.

Hoffmann, M. P., European Search Report for EP 88 11 5654, Oct. 3, 1989, p. 1, European Patent Office.

* cited by examiner

U-NUT FASTENING ASSEMBLY

FIELD OF THE INVENTION

This invention relates to U-Nuts, and particularly to U-Nuts that are used to secure two objects together.

BACKGROUND OF THE INVENTION

U-Nuts are known in the art and are used with fasteners. The present invention is an improved U-Nut.

SUMMARY OF THE INVENTION

The scope of the present invention is defined solely by the appended claims, and is not affected to any degree by the statements within this summary. Briefly stated, a U-Nut, comprising, a substrate including a flex area wherein the substrate and the flex area include a polymer; a first substrate segment, a second substrate segment, and a flex area, wherein the first substrate segment and the second substrate segment are located adjacent to the flex area; a retainer located on the first substrate segment; and an acceptor located on the second substrate segment.

DETAILED DESCRIPTION OF THE PRESENTLY PREFERRED EMBODIMENTS

Figure 1:
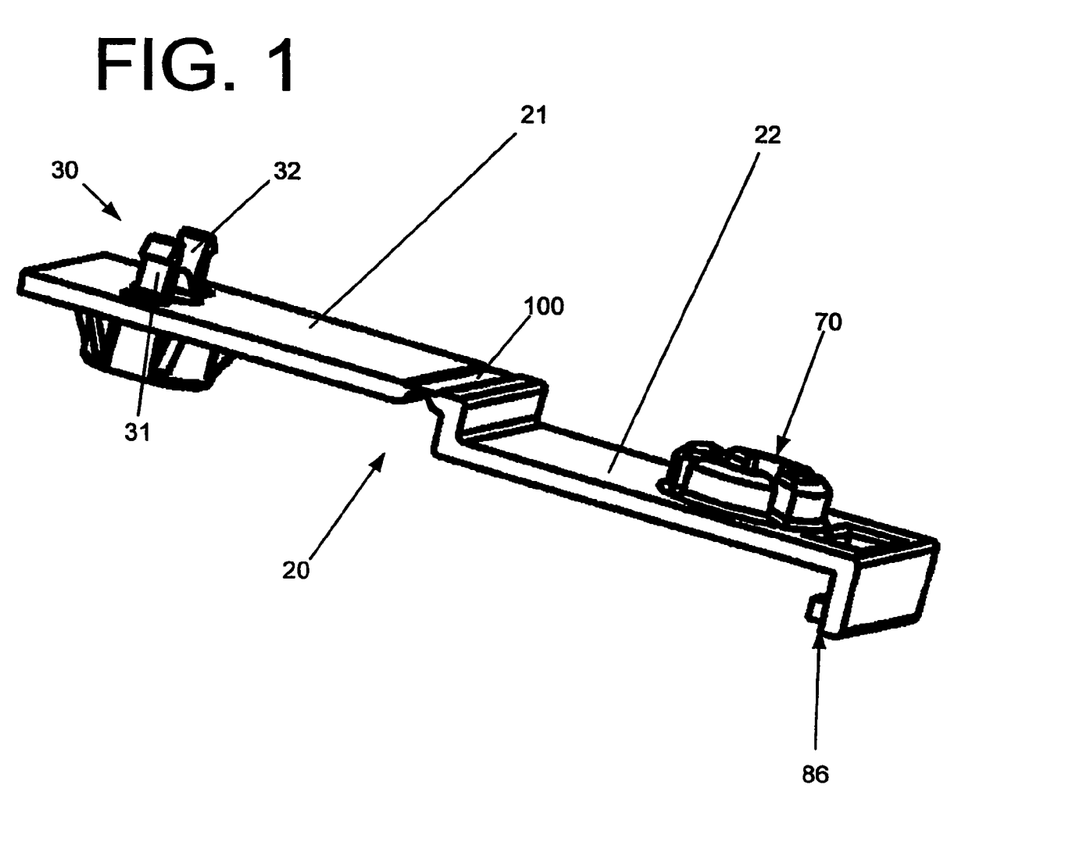
FIG. 1 depicts an elevated side perspective view of the U-Nut of the preferred embodiment.

As shown in FIG. 1, the U-Nut 10 provided with a substrate 20. The substrate 20 is provided with a flex area 100 so that the substrate 20 is flexible. Located adjacent to the flex area 100 are first and second substrate segments 21 and 22 respectively. Located on the substrate 20 is a retainer 30. As shown in FIG. 1, the retainer 30 is located on the first substrate segment 21 and is provided with at least one securing member. In the embodiment shown in FIG. 1, the retainer 30 is provided with a first securing member 31 and a second securing member 32.

According to one aspect of the present invention, the first and second securing members 31, 32 are configured to elastically deform. According to another aspect of the present invention, the first and second securing members 31, 32 are shaped to cooperate with an acceptor 70. According to yet another aspect of the present invention, the first and second securing members 31, 32 are configured to cooperate with a fastener 61, such as a bolt or threaded rod, preferably a self-tapping screw.

Figure 2:
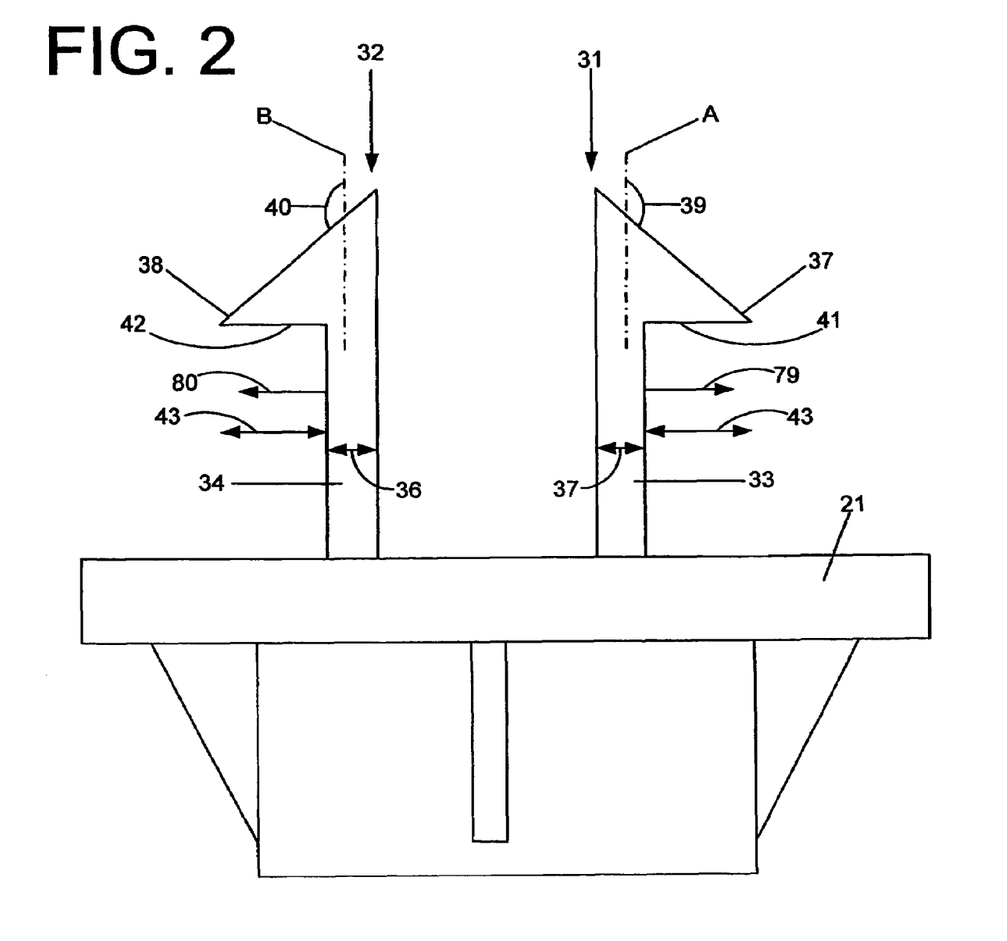
FIG. 2 depicts a side profile view of the U-Nut of the preferred embodiment.

As shown in FIG. 2, the first and second securing members 31, 32 include stems 33 and 34 respectively. The stems 33, 34 are provided with widths 35, 36. Located on the stems 33, 34 are angled surfaces 37 and 38, respectively. As shown in FIG. 2, angled surfaces 37 and 38 are at angles 39 and 40, respectively, with respect to the axis of the stems 33, 34 depicted as imaginary lines A and B, respectively. Angles 39 and 40 range from 90° to 180°, and both preferably measure 45°.

The first and second securing members 31, 32 are provided with coupling surfaces 41 and 42. The coupling surfaces 41, 42 extend beyond the stems 33, 34 a distance 43. Coupling surfaces 41, 42 are configured to couple to the acceptor 50. The coupling surfaces 41, 42 are also configured to cooperate with the angled surfaces 37, 38 so that the securing members 31, 32 are coupled to the acceptor 70.

Figure 3:
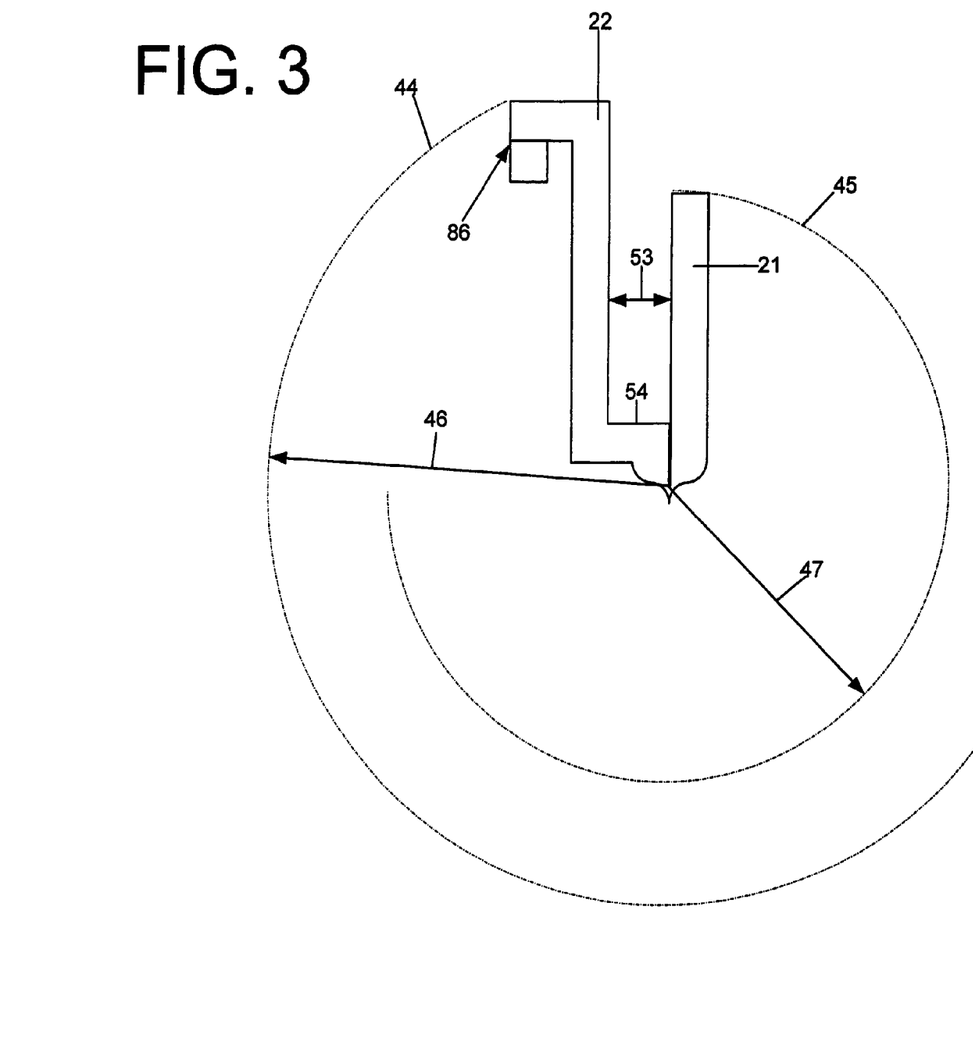
FIG. 3 depicts a side profile view of the substrate on the U-Nut of the preferred embodiment.

The flex area 100 is shaped so that the first and second substrate segments 21 and 22 are flexibly connected at flex area 100. The flex area 100 is configured so that the first and second substrate segments 21, 22 can be brought into closer proximity. As depicted in FIG. 3, the substrate 20 is flexed at flex area 100 so that the substrate first and second substrate segments 21, 22 are brought into contact by moving along predetermined paths depicted as imaginary lines 44, 45 respectively. These imaginary lines 44, 45 are arcs having radii 46, 47 respectively. According to one aspect, the radii 46, 47 are dimensioned according to the substrate 20. According to another aspect, the radii 46, 47 are dimensioned according to there the flex area 100 is located on the substrate 20. According to yet another aspect, the radii 46, 47 are dimensioned according to where the retainer 30 is located on the substrate 20. According to still another aspect, the radii 46, 47 are dimensioned according to where the acceptor 70 is located on the substrate 20.

Figures 4, 4A:
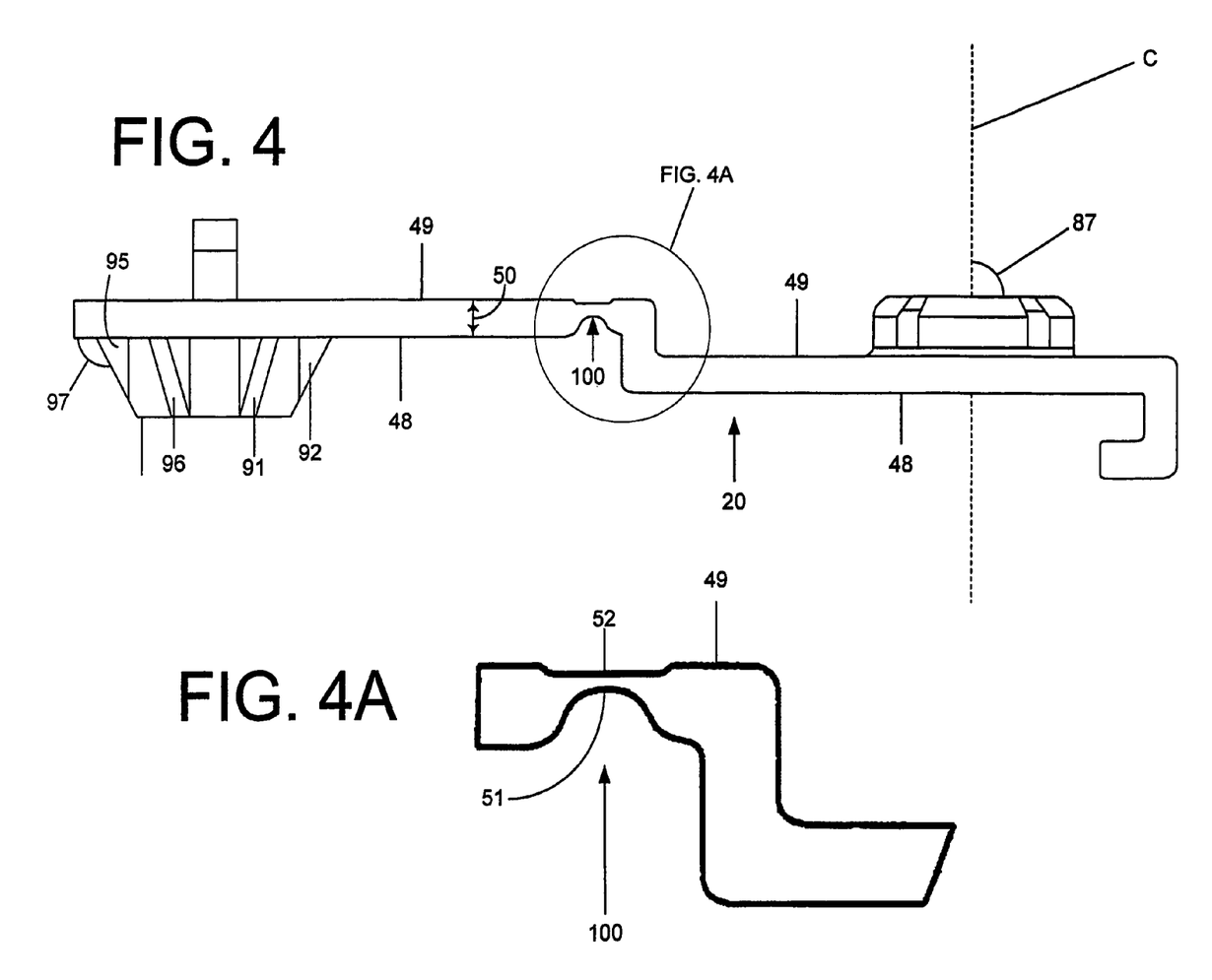
FIG. 4 depicts a side profile view of the U-Nut of the preferred embodiment
FIG. 4A depicts a close up side profile view of the flex area on the U-Nut of the preferred embodiment.

FIG. 4 depicts the substrate 20 with the flex area 100 in greater detail As shown therein, the substrate 20 is provided with a first substrate surface 48, a second substrate surface 49, and a thickness 50. According to one aspect, the thickness 50 is dimensioned so that the substrate 20 has a predetermined strength. According to another aspect, the thickness 50 is dimensioned so that the substrate 20 has a predetermined flexibility. As depicted in FIG. 4A, the substrate 20 is provided with a decreased amount of material at the flex area 100. In the preferred embodiment, the thickness 50 of the substrate 20 is decreased at the flex area 100. According to one aspect, the thickness 50 of the substrate 20 is decreased by molding a curved surface 51 into the first substrate surface. According to another aspect, the thickness 50 is decreased by molding a trough 52 into the second substrate surface 49.

The flex area 100 is shaped so that the substrate 20 flexes at a predetermined location. FIG. 4A, depicts the flex area 100 with the curved surface 51 and one trough 52. The curved surface 51 and the trough 52 are configured to cooperate with one another and are dimensioned so that the substrate 20 can be flexed 270°.

Figure 5:
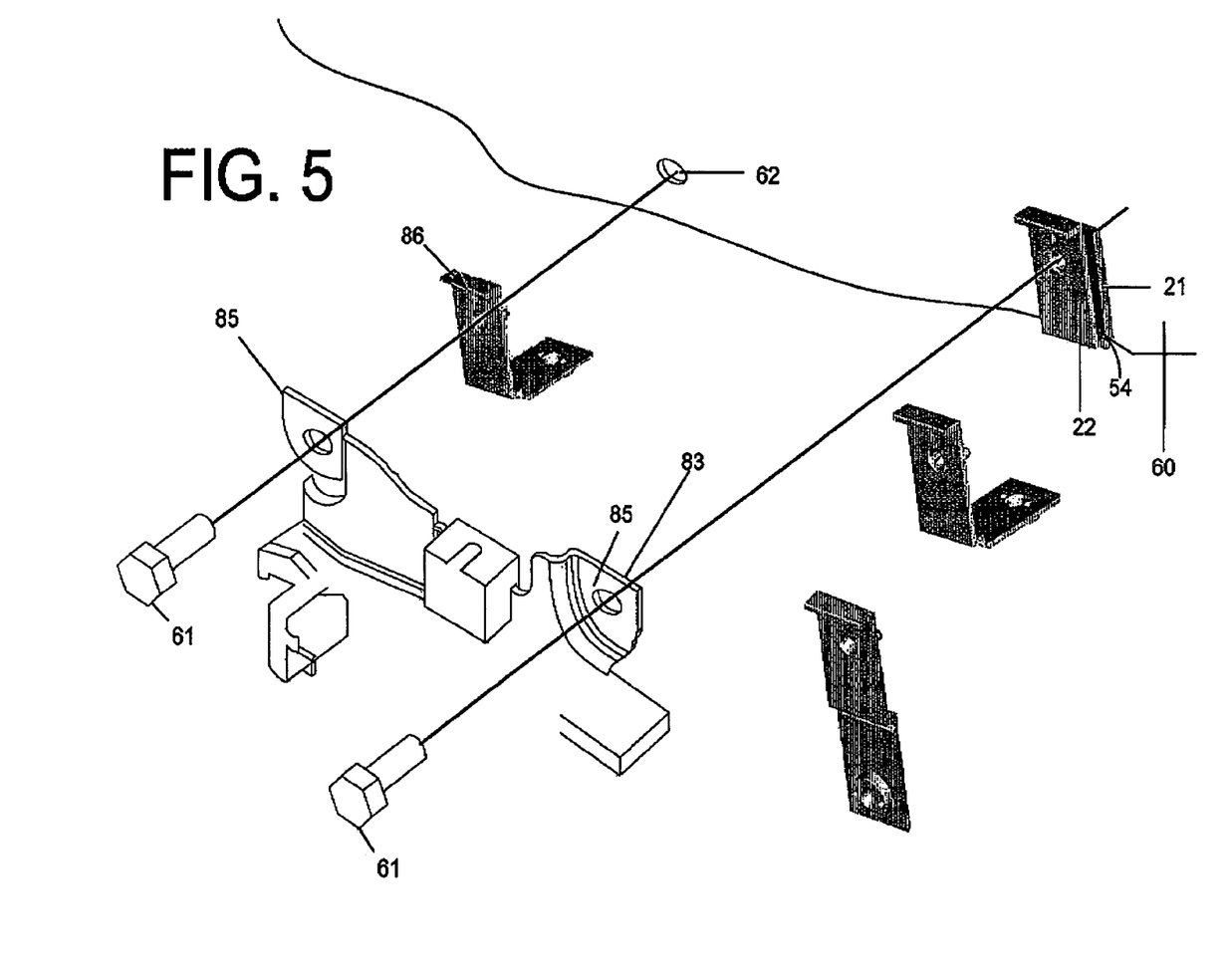
FIG. 5 depicts the U-Nut of the preferred embodiment relative to a window.

The substrate 20 is configured so that the substrate segments 21, 22 enfold a predetermined space 53. As shown in FIG. 3, the substrate 20 includes a spacer 54 that is dimensioned according to the predetermined space 53. In the preferred embodiment, the substrate 20 enfolds a window 60. As shown in FIG. 5, the U-Nut 10 is positioned so that the spacer 54 abuts the window 60. The substrate segments 21, 22 are dimensioned so that the acceptor 70 is push fit into an aperture 62 defined within the window 60.

Figure 8:
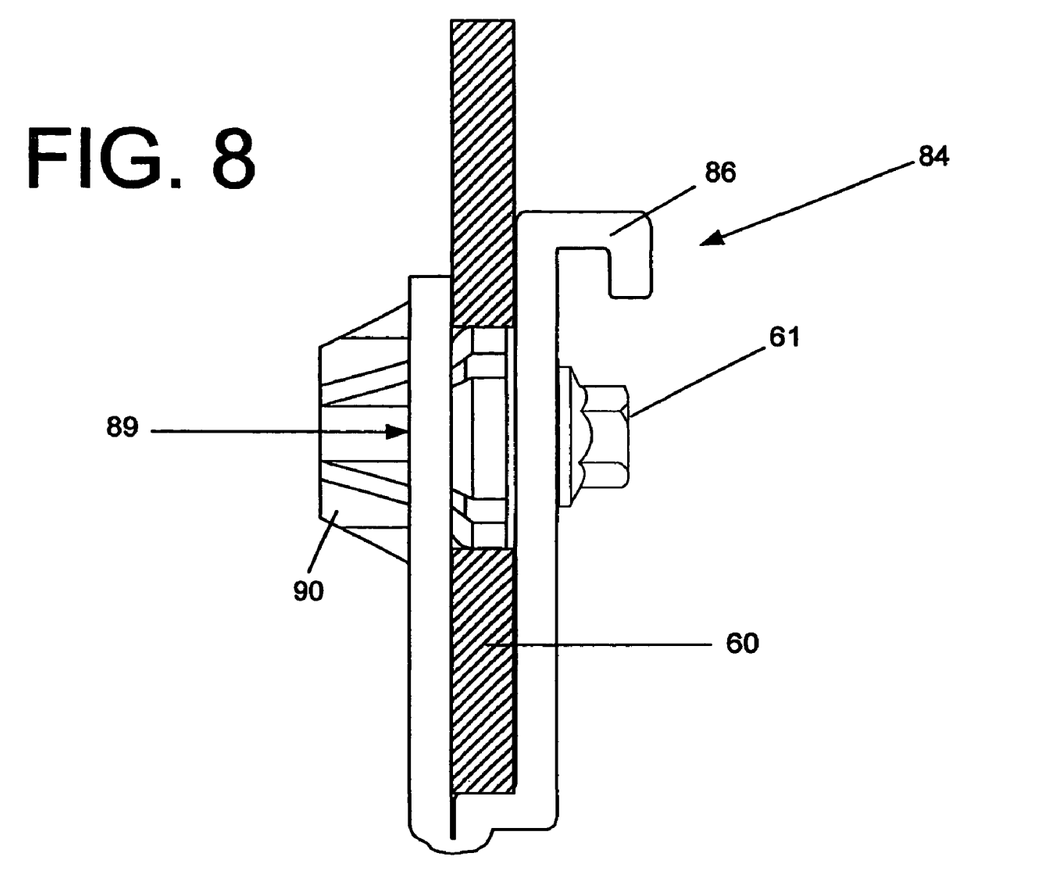
FIG. 8 depicts a side profile view of the U-Nut of the preferred embodiment relative to a window.

The presently preferred embodiment is provided with an installation member 86. As depicted in FIG. 8, the installation member 86 is located on the substrate 20, preferably at an end 84. Referring now to FIG. 5, the installation member is shaped to cooperate with a regulator bracket 85 in an automobile. The installation member 86 is in an "L" shape and configured so that the window is able to be installed and fastened to the regulator bracket with greater ease. As further shown in FIG. 5, the installation member 86 is shaped to rest on an edge 83 of the regulator bracket 85.

Figure 6:
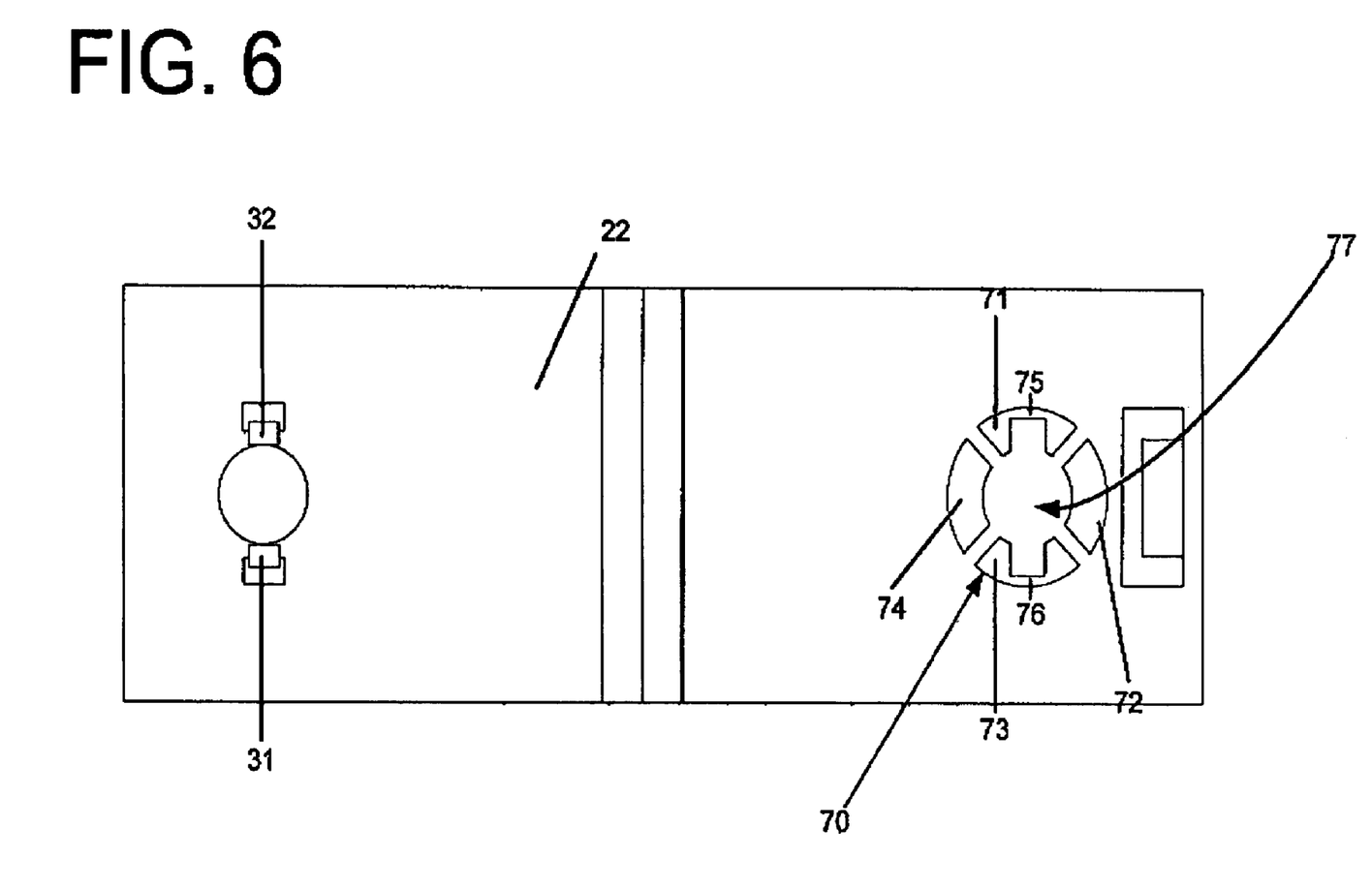
FIG. 6 depicts a top profile view of the U-Nut of the preferred embodiment.

The acceptor 70, shown in FIG. 6, is configured to be push-fit Accordingly, the acceptor 70 is shown being push fit through an aperture. In the preferred embodiment, the acceptor 70 is a plurality of acceptor segments 71, 72, 73, 74. The acceptor 70 is segmented so that a predetermined resilience is achieved. According to one aspect of the present invention, the number of acceptor segments is increased so that greater resilience is achieved. According to another aspect, the number of acceptor segments is decreased so that the acceptor 70 is less resilient. In one embodiment, the acceptor 70 is solid and provides minimal resilience. The amount of resilience of the acceptor 70 and the dimensions of the acceptor 70 are determined according to the size of the aperture 62.

The acceptor 70 is configured to accept the retainer 30. In operation, the substrate segments 21, 22 are brought into closer proximity so that the angled surfaces 37 and 38 located on the securing members 31, 32 of the retainer 30 contact cooperating surfaces 75, 76 (shown in FIG. 6) located on the acceptor 70. In the preferred embodiment, the second substrate segment 22 defines an opening 77 shaped to accommodate the securing members 31, 32. As shown in FIG. 6, the cooperating surfaces 75 and 76 are shown as two surfaces; however, in an alternative embodiment, the cooperating surfaces 75 and 76 are merged into a single cooperating surface. The cooperating surfaces 75, 76 are configured to cooperate with the angled surfaces 37, 38 located on the securing members 31, 32. Advantageously, as shown in FIG. 4, the cooperating surfaces 75, 76 are at an angle 87 relative to an axis of the stems 33, 34 depicted as an imaginary line C. The angle 87 ranges from 90° to about 180°.

After the angled surfaces 37, 38 contact the cooperating surfaces 75, 76 and as the substrate segments 21, 22 continue to move along the respective predetermined paths 44, 45, the cooperating surfaces 75 and 76 force the securing members 31, 32 a distance 78 together. According to one aspect, that distance 78 is determined according to the angles 39, 40. According to another aspect, the distance 78 is determined according to the widths 35, 36 of the stems 33, 34. According to yet another aspect, the distance 78 is determined according to the distance 43 the coupling surfaces 41, 42 extend beyond the stems 33, 34.

After the securing members 31, 32 are forced a distance 78 together and as the substrate segments 21, 22 continue to move along the respective predetermined paths 44, 45 so that the angled surfaces 31, 32 move beyond the cooperating surfaces 75, 76 the securing members 31, 32 snap back into place in the direction of arrows 79, 80, shown in FIG. 2. After the securing members 31, 32 snap back into place, the coupling surfaces 41, 42 engage securing surfaces 81, 82 (shown in FIG. 7) located on the acceptor 70.

Figure 7:
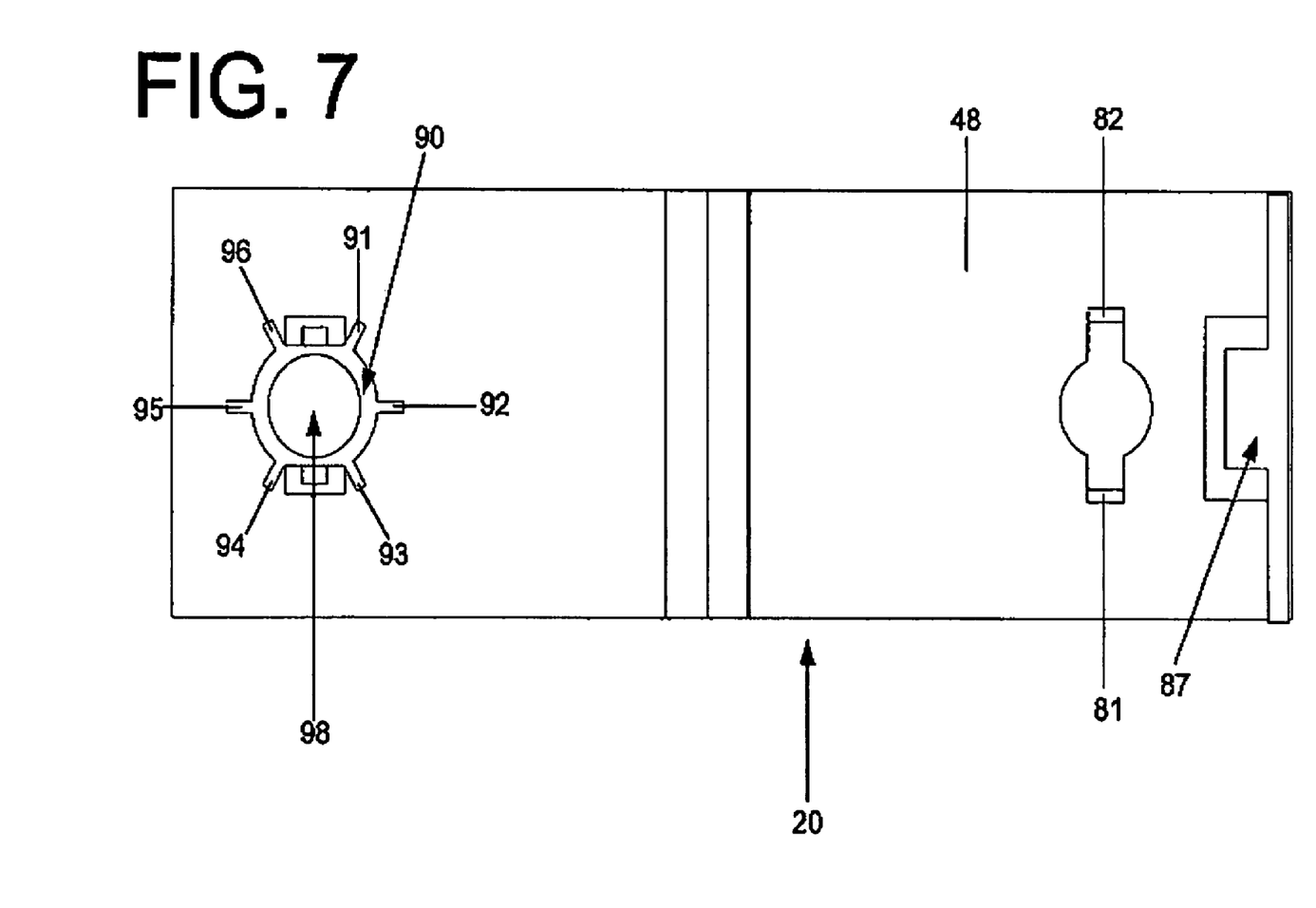
FIG. 7 depicts a bottom profile view of the U-Nut of the preferred embodiment.

As shown in FIG. 7, the substrate 20 is provided with a fastening member 90, configured to cooperate with a fastener 61, preferably a self-tapping screw. The fastening member 90 defines an aperture 98 that is dimensioned according to the fastener 61. After the acceptor 70 has been inserted into the aperture 62 of the window 60 and the coupling surfaces 41, 42 engage the securing surfaces 81, 82 the fastener 61 is inserted into the acceptor 70 and the fastening member 90.

The fastener 61, in the preferred embodiment as a self-tapping screw, causes threads to be tapped in the fastening member 90 and the acceptor 70 when the, screw is inserted into the U-Nut 10. The acceptor 70 that has been push fit into the aperture 62 of the window 60 expands within the aperture 62 so that a more secure fastening is achieved.

The fastening member 90 is configured to cooperate with the fastener 61. When the fastener 61 is inserted into the fastening member 90, a clamping force, depicted as arrow 89 in FIG. 8, is exerted. As depicted in FIG. 7, the fastening member 90 is provided with a plurality of ribs 91, 92, 93, 94, 95, and 96. The ribs 91, 92, 93, 94, 95, 96 are equally spaced apart and are at an angle 97 relative to the plane of the substrate 11, as depicted in FIG. 4. The angle 97 is determined according to the clamping force 89 exerted by the fastener 61. The clamping force 89 exerted by the fastener 61 is distributed to the substrate 20 through the ribs 91, 92, 93, 94, 95, 96. The area of the substrate 20 over which the clamping force 89 is distributed is determined by the angle 97. As depicted in FIG. 8, the clamping force 89 distributed to the substrate 20 is exerted on the object being fastened, in this case, the window 60. In the preferred embodiment, the angle 97 is 60°; however, in alternative embodiments, the angle 97 measures above 0° to about 90°.

The U-Nut 10 is molded of a polymer, advantageously a nylon, such as nylon 66. The preferred embodiment is molded from Vydyne 22H produced by the Dow Chemical Company. However, in alternative embodiments, the U-Nut 10 is molded of a polymer having a low creep and high tensile strength.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A u-nut assembly, comprising:
   a) a substrate including a polymer;
   b) a first substrate segment, a second substrate segment, and a flex area, wherein the first substrate segment and the second substrate segment are located adjacent to the flex area and the flex area is configured so that the first and second substrate segments are capable of being brought into contact by moving along a predetermined path;
   c) a retainer including a first securing member and a second securing member, wherein the first securing member includes a first angled surface and a first coupling surface and the second securing member includes a second angled surface and a second coupling surface, wherein the retainer is located on the first substrate segment;
   d) an acceptor located on the second substrate segment including a first cooperating surface, a second cooperating surface, a first securing surface, and a second securing surface, wherein the first and second securing members are snap fit within the acceptor, whereby:
      i. the flex area flexing so that the first and second substrate segments are brought into closer proximity;
      ii. the flex area flexing so that the first angled surface contacts the first cooperating surface and the second angled surface contacts the second cooperating surface to force the first and second securing members a distance together;

iii. the flex area flexing so that the first and second angled surfaces move beyond the cooperating surfaces;

iv. the flex area flexing so that after the first and second securing members are forced a distance together they move a distance apart;

v. the flex area flexing so that the first coupling surface engages the first securing surface and the second coupling surface engages the second securing surface thereby coupling the acceptor to the retainer; and e) a fastener configured to tap threads into the acceptor, wherein the fastener exerts a clamping force on at least one of the substrate segments.

2. The u-nut according to claim 1, further comprising a fastener configured to tap threads into the acceptor.

3. The u-nut according to claim 1, further comprising an installation member located on an end of the substrate that is configured to rest upon an edge of a bracket.

4. The u-nut according to claim 1, further comprising:
a) an installation member located on an end of the substrate that is configured to rest upon an edge of a bracket; and
b) a fastener configured to tap threads into the acceptor.

5. The u-nut according to claim 1, further comprising:
a) an installation member located on an end of the substrate that is configured to rest upon an edge of a bracket;
b) a fastener configured to tap threads into the acceptor; and
c) a plurality of acceptor segments that are included in the acceptor.

6. The u-nut according to claim 1, wherein the first angled surface is at an angle with respect to an axis of the first stem that measures 45° and the second angled surface is at an angle with respect to an axis of the second stem that measures 45°.

7. The u-nut according to claim 1, wherein the acceptor includes a plurality of acceptor segments.

8. The u-nut according to claim 1, further comprising:
a) a plurality of acceptor segments that are included in the acceptor; and
b) an, installation member located on an end of the substrate that is configured to rest upon an edge of a bracket.

9. The u-nut according to claim 1, wherein:
a) the first securing member is provided with a first stem and the second securing member is provided with a second stem; and
b) the first and second securing members are snap fit within the acceptor.

10. The u-nut according to claim 9, wherein the first angled surface is at an angle with respect to an axis of the first stem that measures 45° and the second angled surface is at an angle with respect to an axis of the second stem that measures 45°.

11. The u-nut according to claim 1, further comprising an installation member located on an end of the substrate that is configured to rest upon an edge of a bracket.

12. The u-nut of claim 1, further comprising an installation member located on an end of the substrate that is configured to rest upon an edge of a bracket and provided with a first portion that is generally perpendicular to a plane of at least one of the first or second substrate segments and a second portion that is generally parallel to the plane of at least one of the first or second substrate segments.

* * * * *